(12) United States Patent
Takahashi et al.

(10) Patent No.: US 11,586,850 B2
(45) Date of Patent: Feb. 21, 2023

(54) PATTERN RECOGNITION SYSTEM, PARAMETER GENERATION METHOD, AND PARAMETER GENERATION PROGRAM

(71) Applicant: NEC Corporation, Tokyo (JP)

(72) Inventors: Katsuhiko Takahashi, Tokyo (JP); Hiroyoshi Miyano, Tokyo (JP); Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 212 days.

(21) Appl. No.: 17/044,425

(22) PCT Filed: May 10, 2018

(86) PCT No.: PCT/JP2018/018104
§ 371 (c)(1),
(2) Date: Oct. 1, 2020

(87) PCT Pub. No.: WO2019/215868
PCT Pub. Date: Nov. 14, 2019

(65) Prior Publication Data
US 2021/0027110 A1  Jan. 28, 2021

(51) Int. Cl.
*G06K 9/62* (2022.01)
*G06V 10/75* (2022.01)

(52) U.S. Cl.
CPC ......... *G06K 9/6262* (2013.01); *G06V 10/751* (2022.01)

(58) Field of Classification Search
CPC ...... G06V 10/151; G06K 9/62; G06K 9/6262; G06K 9/6202
See application file for complete search history.

(56) References Cited

U.S. PATENT DOCUMENTS 9,602,783 B2 * 3/2017 Sugishita ............... H04N 7/188
10,204,283 B2 * 2/2019 Tate ...................... G06K 9/6227
(Continued)

FOREIGN PATENT DOCUMENTS

| JP | 2007-058882 A | 3/2007 |
| JP | 2008-204102 A | 9/2008 |

(Continued)

OTHER PUBLICATIONS

Japanese Office Action for JP Application No. 2020-517696 dated Aug. 10, 2021 with English Translation.
(Continued)

*Primary Examiner* — Tuan H Nguyen

(57) ABSTRACT

The first parameter generation unit 811 generates a first parameter, which is a parameter of a first recognizer, using first learning data including a combination of data to be recognized, a correct label of the data, and domain information indicating a collection environment of the data. The second parameter generation unit 812 generates a second parameter, which is a parameter of a second recognizer, using second learning data including a combination of data to be recognized that is collected in a predetermined collection environment, a correct label of the data, and target domain information indicating the predetermined collection environment, based on the first parameter. The third parameter generation unit 813 integrates the first parameter and the second parameter to generate a third parameter to be used for pattern recognition of input data by learning using the first learning data.

10 Claims, 7 Drawing Sheets

(56) References Cited

U.S. PATENT DOCUMENTS

2009/0324060 A1    12/2009    Sato et al.
2015/0363670 A1    12/2015    Sugishita et al.
2016/0012277 A1     1/2016    Tate et al.

FOREIGN PATENT DOCUMENTS

| JP | 2010-009518 A | 1/2010 |
| JP | 2010-271861 A | 12/2010 |
| JP | 2016-015116 A | 1/2016 |
| JP | 2016-018538 A | 2/2016 |
| JP | 2017-138608 A | 8/2017 |

OTHER PUBLICATIONS

International Search Report for PCT Application No. PCT/JP2018/018104, dated Jun. 12, 2018.

\* cited by examiner

PATTERN RECOGNITION SYSTEM, PARAMETER GENERATION METHOD, AND PARAMETER GENERATION PROGRAM

This application is a National Stage Entry of PCT/JP2018/018104 filed on May 10, 2018, the contents of all of which are incorporated herein by reference, in their entirety.

TECHNICAL FIELD

The present invention relates to a pattern recognition system that improves pattern recognition performance, and a parameter generation method and a parameter generation program for generating a parameter of a recognizer to be used in pattern recognition.

BACKGROUND ART

It is known that the performance of a recognition engine can be improved by learning using many pattern data. Moreover, tuning from a basic recognition engine to a recognition engine adapted to each environment is also performed. It is to be noted that a recognition engine may also be called a recognizer.

Moreover, various methods have been proposed for improving recognition accuracy depending on different environments. For example, PTL 1 describes a pattern recognition device that performs recognition processing depending on an environment in which a character is written. The pattern recognition device described in PTL 1 calls any one or more of pattern recognition processes for each state of a processing target extracted from an input image to perform recognition processing.

Moreover, PTL 2 describes an image recognition method of avoiding lengthening of additional learning due to a difference in imaging environments. In the image recognition method described in PTL 2, a similarity is calculated from a finite difference between an imaging environment at the time of imaging and an imaging environment information indicating each imaging environment managed in a parameter table. If the parameter table does not have imaging environment information indicating an imaging environment with a similarity higher than a predetermined threshold, a recognition control parameter corresponding to an imaging environment with the highest similarity among similarities smaller than the predetermined threshold is selected. Then, based on the selected recognition control parameter, a predetermined learning algorithm is used to generate a recognition control parameter to be used for recognition of a newly acquired image.

CITATION LIST

Patent Literature

PTL 1: Japanese Patent Application Laid-Open No. 2007-058882
PTL 2: Japanese Patent Application Laid-Open No. 2016-015116

SUMMARY OF INVENTION

Technical Problem

Since a recognition engine tuned for each environment is also assumed to deteriorate in performance over time, performance improvement may be necessary. However, since much worker labor is required to keep updating the recognition engine for each environment individually, it is necessary to reduce the worker labor.

A common approach to reduce the worker labor is to collect as many learning patterns as possible and construct a recognition dictionary having higher generalization performance. For example, in the case of constructing a recognition dictionary for pattern recognition of images, a method of setting a correct label only to some learning data, and a method of learning not using a correct label but using only an image are also known. Although it is generally considered good to prepare a large amount of high-quality learning data (sets of images and precise correct labels) for learning, collecting a large number of learning patterns requires extremely high cost.

For example, in the case of performing pattern recognition of image data, it is ideal to collect learning patterns that can cover variations of installation environments of a camera in order to learn a basic recognition engine. However, collecting such learning patterns is physically or costly difficult.

Moreover, there is a case where a recognition engine that is actually used in an environment of a certain customer exists and other customers can also use the recognition engine for the same purpose. However, even if such a recognition engine exists, it is not allowed in most cases to bring out the learning patterns (data) of customers or to use the data for other purposes. It is therefore difficult to use the learning patterns (data) used in the operation for tuning a new recognition engine.

For example, in a method described in PTL 2, a recognition control parameter corresponding to an imaging environment with a high similarity is selected, and a new recognition control parameter is generated based on the selected recognition control parameter. However, since the method described in PTL 2 is a method of improving the recognition accuracy for each imaging environment, it is difficult to improve the recognition accuracy of a recognition control parameter assuming an imaging environment other than the above one, and as a result, it is difficult to improve the generalization performance of the recognition engine.

If the generalization performance of a basic recognition engine can be improved, the tuning work of the recognition engine for each environment can be reduced. On the other hand, since it is difficult to directly use the learning pattern used for tuning the recognition engine for each environment to learning of the basic recognition engine, it is preferable that the generalization performance of the basic recognition engine can be improved without increasing the learning patterns.

Therefore, an object of the present invention is to provide a pattern recognition system, a parameter generation method, and a parameter generation program that can improve the generalization performance of a recognizer that performs pattern recognition without increasing the learning patterns.

Solution to Problem

A pattern recognition system of the present invention is a pattern recognition system including a pattern recognition device configured to recognize a pattern of input data, in which the pattern recognition device includes: a first parameter generation unit configured to generate a first parameter, which is a parameter of a first recognizer, using first learning data including a combination of data to be recognized, a correct label of the data, and domain information indicating a collection environment of the data; a second parameter generation unit configured to generate a second parameter, which is a parameter of a second recognizer, using second learning data including a combination of data to be recognized that is collected in a predetermined collection environment, a correct label of the data, and target domain information indicating the predetermined collection environment, based on the first parameter; and a third parameter generation unit configured to integrate the first parameter and the second parameter to generate a third parameter to be used for pattern recognition of the input data by learning using the first learning data, and the third parameter generation unit generates the third parameter so as to prioritize a recognition result obtained using the second parameter in learning using the first learning data including domain information that coincides with the target domain information.

A parameter generation method of the present invention is a parameter generation method including steps of: generating a first parameter, which is a parameter of a first recognizer, using first learning data including a combination of data to be recognized, a correct label of the data, and domain information indicating a collection environment of the data; generating a second parameter, which is a parameter of a second recognizer, using second learning data including a combination of data to be recognized that is collected in a predetermined collection environment, a correct label of the data, and target domain information indicating the predetermined collection environment, based on the first parameter; integrating the first parameter and the second parameter to generate a third parameter to be used for pattern recognition of the input data by learning using the first learning data; and generating the third parameter so as to prioritize a recognition result obtained using the second parameter in learning using the first learning data including domain information that coincides with the target domain information in the step of generating the third parameter.

A parameter generation program of the present invention is a parameter generation program for causing a computer to execute: a first parameter generation process of generating a first parameter, which is a parameter of a first recognizer, using first learning data including a combination of data to be recognized, a correct label of the data, and domain information indicating a collection environment of the data; a second parameter generation process of generating a second parameter, which is a parameter of a second recognizer, using second learning data including a combination of data to be recognized that is collected in a predetermined collection environment, a correct label of the data, and target domain information indicating the predetermined collection environment, based on the first parameter; and a third parameter generation process of integrating the first parameter and the second parameter to generate a third parameter to be used for pattern recognition of the input data by learning using the first learning data, and causing the computer to generate the third parameter so as to prioritize a recognition result obtained using the second parameter in learning using the first learning data including domain information that coincides with the target domain information in the third parameter generation process.

Advantageous Effects of Invention

It is possible with the present invention to improve the generalization performance of a recognizer that performs pattern recognition without increasing the learning patterns.

DESCRIPTION OF EMBODIMENTS

The following description will explain exemplary embodiments of the present invention with reference to the drawings.

First Exemplary Embodiment

Figure 1:
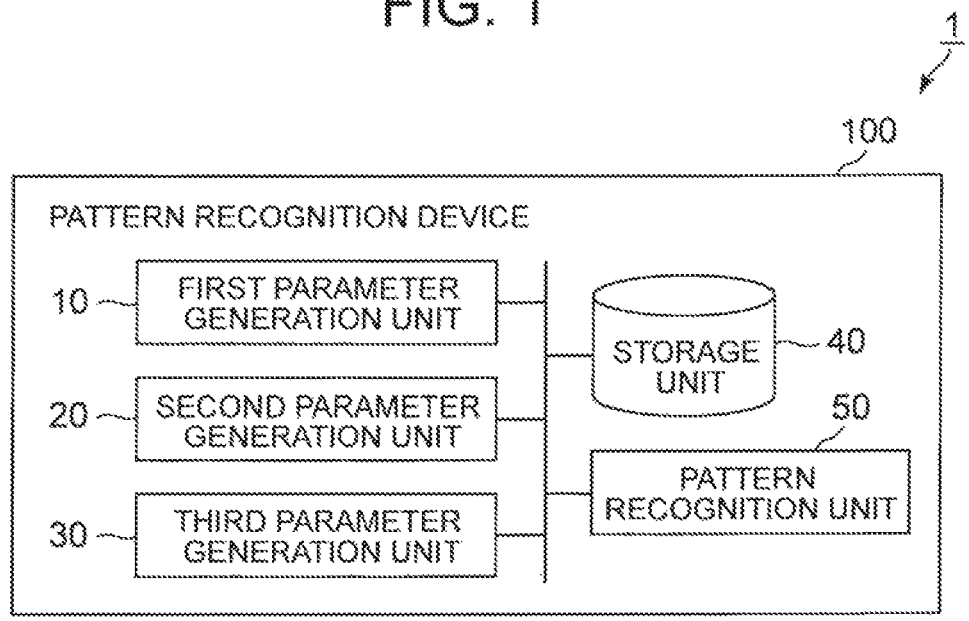
FIG. 1 It depicts a block diagram illustrating a configuration example of a first exemplary embodiment of a pattern recognition system of the present invention.

FIG. 1 is a block diagram illustrating a configuration example of the first exemplary embodiment of a pattern recognition system of the present invention. A pattern recognition system 1 of this exemplary embodiment includes a pattern recognition device 100 that recognizes a pattern of target input data. The mode of the data for which the pattern recognition device 100 recognizes a pattern is arbitrary, and examples thereof include image data, video data, acoustic data, text data, and the like.

The pattern recognition device 100 includes a first parameter generation unit 10, a second parameter generation unit 20, a third parameter generation unit 30, a storage unit 40, and a pattern recognition unit 50.

The storage unit 40 stores data (which will be hereinafter referred to as learning data) for learning a recognizer to be used for pattern recognition. The storage unit 40 also stores a parameter for specifying a recognizer. A parameter is generated by the first parameter generation unit 10, the second parameter generation unit 20, and the third parameter generation unit 30, which will be described later. It is to be noted that the storage unit 40 may store a parameter of a recognizer generated by another device (not shown) or the like. The storage unit 40 is realized by, for example, a magnetic disk or the like.

The learning data includes a combination of data to be recognized, a correct label of the data, and information (which will be hereinafter referred to as domain information) indicating a collection environment of the data. In the case of video data, for example, the domain information is the installation angle, direction, and height of the camera, whether the camera is installed indoors or outdoors, the orientation of the recognition target, the angle of view, the lens, the distortion coefficient, the imaging noise state, the video compression noise state, and the like. The orientation of the recognition target is whether the recognition target always comes from the front or not or the like in a case where the image is captured by a camera installed at a ticket gate, for example. It is to be noted that the learning data may include information other than such a combination, and may include, for example, the weight of data to be used for learning.

In this exemplary embodiment, three types of parameters are assumed as parameters for specifying a recognizer. The first parameter is a parameter for specifying a basic recognizer. The second parameter is a parameter generated based on the recognizer specified by the first parameter, and is a parameter tuned from the first parameter in order to perform recognition processing especially in a predetermined environment. Therefore, it can be said that the second parameter is a parameter derived from the first parameter.

The third parameter is a parameter generated by integrating a first parameter that specifies a basic recognizer and a second parameter that specifies a recognizer to be used in a predetermined environment. This exemplary embodiment aims to generate a third parameter that exceeds the performance of the first parameter by reflecting the recognition performance to be used in a predetermined environment on the recognition performance of the basic recognizer. The method of generating each parameter will be described later.

The first parameter generation unit 10 generates the first parameter using learning data. The learning data used by the first parameter generation unit 10 will be hereinafter referred to as first learning data. As described above, the first parameter is a parameter for specifying the basic recognizer, and this recognizer corresponds to a main recognizer for other recognizers. In the following description, the recognizer specified by the first parameter will be referred to as a first recognizer. The first recognizer can also be called a main AI (Artificial Intelligence). The method by which the first parameter generation unit 10 learns a recognizer is arbitrary, and a widely known method may be used.

The second parameter generation unit 20 generates the second parameter using the learning data based on the first parameter (i.e., parameter of basic recognizer). Similar to the first learning data, the learning data used by the second parameter generation unit 20 also includes a combination of data to be recognized, a correct label of the data, and domain information of the data.

However, the learning data to be used by the second parameter generation unit 20 includes a combination of data collected in a predetermined collection environment, a correct label of the data, and information (which will be hereinafter referred to as target domain information) indicating a predetermined collection environment. The learning data to be used by the second parameter generation unit 20 will be hereinafter referred to as second learning data.

The predetermined collection environment is an environment in which the data recognized by the second recognizer is collected. For example, when an image is captured by a camera installed on the ceiling of a store, it can be said that the predetermined collection environment is an environment in which data is photographed from an oblique direction, for example. Moreover, for example, when an image of the entrance of a building is captured at night, it can be said that the predetermined collection environment is an environment in which an image is captured outdoors at night.

From these, it can also be said that the second parameter learned based on the second learning data is a parameter having recognition performance specialized for a predetermined collection environment. Moreover, the first recognizer can be called a main AI, while the second recognizer can be called a secondary AI. Moreover, it can also be said that the second learning data is data that can be handled only by each customer, for example.

The method by which the second parameter generation unit 20 learns the second parameter is also arbitrary. The second parameter generation unit 20 may learn the second parameter using the same method as the method used by the first parameter generation unit 10 to learn the first parameter. In this case, it can be said that the second parameter to be generated is a parameter generated as a result of learning using both the first learning data and the second learning data.

It is to be noted that the second learning data is assumed to include common domain information indicating a predetermined collection environment. Therefore, the second learning data may separately hold common domain information and include only the data and the correct label.

The second parameter generation unit 20 may generate the second parameter using the second learning data, which includes a combination of data collected separately from the data included in the first learning data, the correct label, and the target domain information, as the second learning data. Examples of a situation in which such second learning data can be used include a case where the learning data can be acquired during the operation of the customer.

Figure 2:
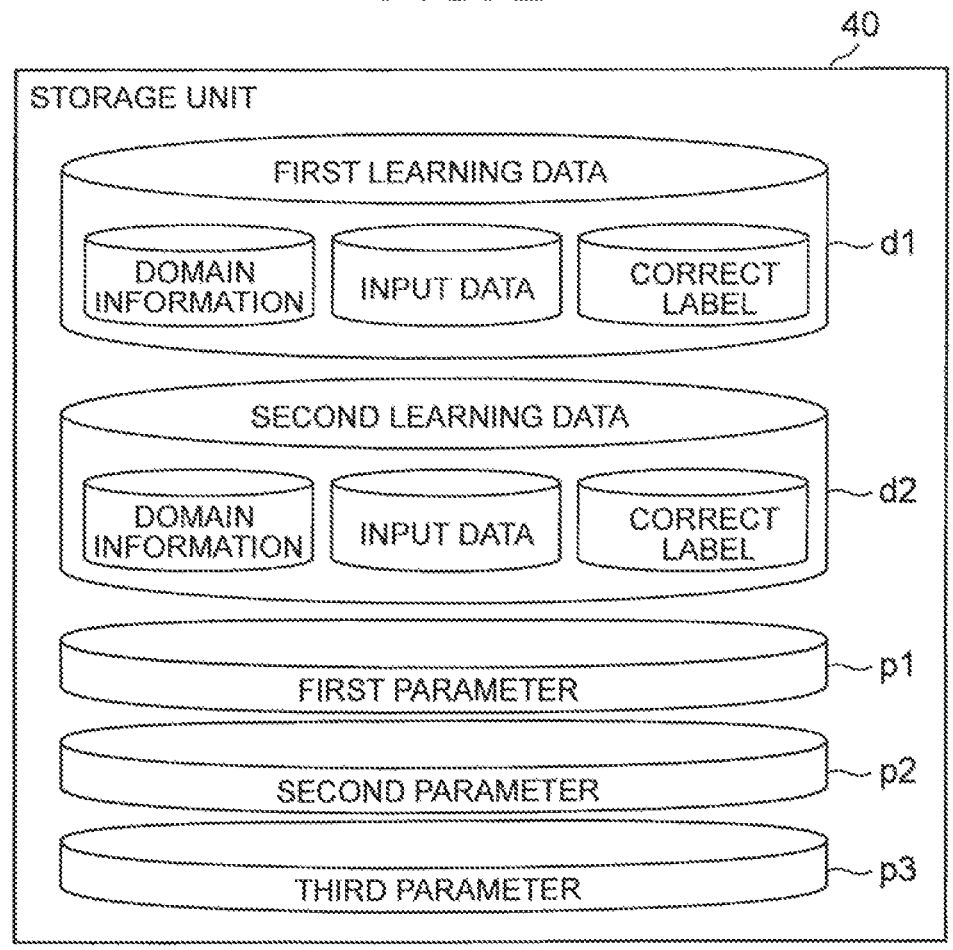
FIG. 2 It depicts an explanatory diagram illustrating an example of information stored in a storage unit.

FIG. 2 is an explanatory diagram illustrating an example of information stored in the storage unit 40. The example illustrated in FIG. 2 shows that the storage unit 40 respectively stores first learning data d1 to be used for learning the first parameter, second learning data d2 to be used for learning the second parameter, and three types of parameters, that is, the first parameter p1, the second parameter p2, and the third parameter p3. Moreover, the example illustrated in FIG. 2 shows that the first learning data d1 and the second learning data d2 are data each including input data to be recognized, a correct label, and domain information.

Although the first learning data d1 and the second learning data d2 are both stored in the storage unit 40 in the example illustrated in FIG. 2, it is to be noted that the first learning data d1 and the second learning data d2 may be stored in different storage devices.

On the other hand, it may be assumed that the data being operated by the customer cannot be used as learning data. In such a case, the second parameter generation unit 20 may extract data of the collection environment that is the same as or similar to the collection environment indicated by the domain information included in the first learning data from the first learning data as the second learning data, and generate a second parameter using the extracted learning data as the second learning data. In the following description, learning data that is the same as or similar to the predetermined collection environment may be referred to as learning data that coincides with the predetermined environment.

The criteria for determining whether the domain information is the same or similar (that is, they coincide with each other) may be preset. For example, as a criteria of coincidence of the domain information indicating the angle at which the recognition target is photographed by a camera, it may be preset that the information coincides if the angle is within a range (e.g., within 10 degrees).

Figure 3:
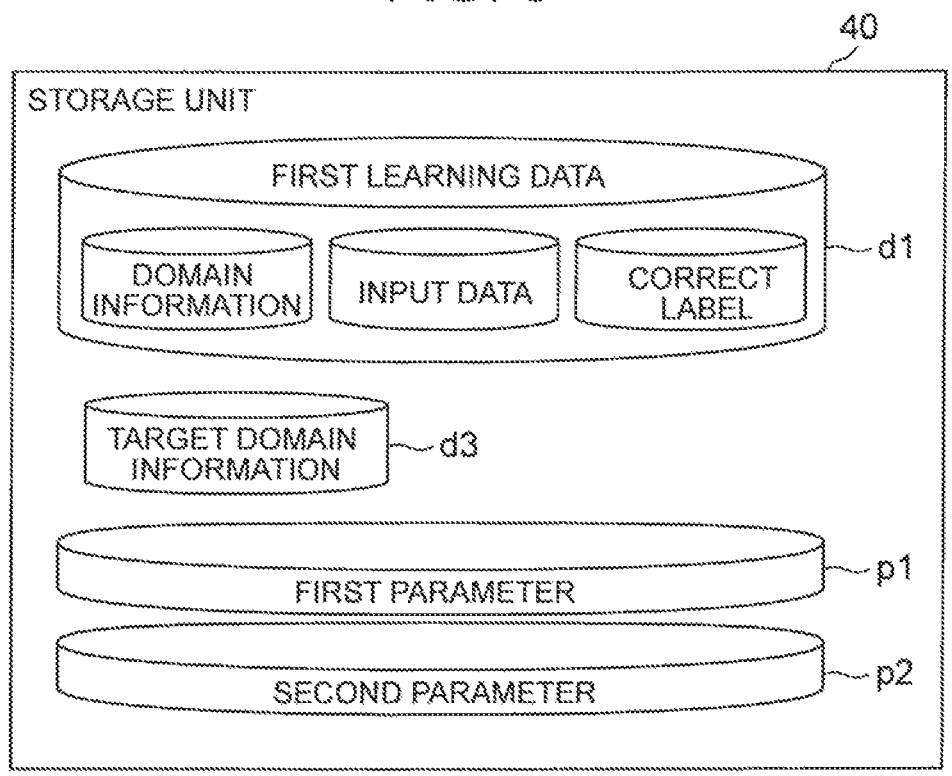
FIG. 3 It depicts an explanatory diagram illustrating another example of information stored in a storage unit.

FIG. 3 is an explanatory diagram illustrating another example of information stored in the storage unit 40. The example illustrated in FIG. 3 shows that the storage unit 40 respectively stores the first learning data d1 to be used for learning the first parameter, the target domain information d3 to be used for learning the second parameter, and the first parameter p1 and the second parameter p2. It is to be noted that the storage unit 40 may store the third parameter p3 as illustrated in FIG. 2.

Moreover, although FIG. 3 illustrates a case where both the first learning data d1 and the target domain information d3 are stored in the storage unit 40, the first learning data d1 and the target domain information d3 may be stored in different storage devices.

The third parameter generation unit 30 integrates the first parameter and the second parameter to generate a third parameter to be used for pattern recognition of data to be recognized by learning using the first learning data. The third parameter is used, for example, when the pattern recognition unit 50, which will be described later, recognizes the pattern of input data.

Specifically, the third parameter generation unit 30 generates the third parameter so as to prioritize the recognition result obtained using the second parameter in the learning using the first learning data including the domain information that coincides with the target domain information.

For example, the third parameter generation unit 30 may take in both the recognizer using the first parameter and the recognizer using the second parameter, and generate the third parameter so as to balance the performance of both recognizers according to the domain information included in the learning data. In this case, the storage unit 40 holds each parameter (or recognizer) and the ratio (or the number) of domain information included in the used learning data in association with each other, for example.

Then, the third parameter generation unit 30 may generate a third parameter so as to prioritize a recognition result of a parameter more as the degree of coincidence with the domain information included in the learning data used for learning the parameter is higher. This means that a discrimination result is balanced closer to the learned domain environment. This can also be said that the reliability of a discriminator learned based on data collected in a similar domain environment is made higher.

For example, assume that there are a recognizer A learned using an image captured from a horizontal direction, and a recognizer B learned using an image captured from an oblique direction. Generally, the recognizer outputs a certainty factor (e.g., the certainty factor when trusting is 1, the certainty factor when not trusting is 0, and the certainty factor gets closer to 1 as the certainty becomes higher) together with the recognition result. Here, assume that the recognizer A outputs 0.3 as the certainty factor of an image captured from an oblique direction. In this case, since the domain environment of the learned data is different, it is assumed that the recognizer A has a certainty factor lower than assumed. In this case, the third parameter generation unit 30 may correct the certainty factor by using the above-mentioned "degree of coincidence" as a weight.

Then, the third parameter generation unit 30 may calculate an average from the sum of the recognition results thus calculated for each recognition result of a certainty factor, and generate the third parameter so that the recognition result with the highest average is adopted as the final recognition result.

Moreover, the third parameter generation unit 30 may set the weight information in the first learning data itself. Specifically, the third parameter generation unit 30 may set the ratio of the domain information of the learning data used for learning the second parameter as the weight of the learning data. For example, the third parameter generation unit 30 may simply set 1 to the learning data including the domain information that coincides with the target domain, and set 0 to the different domain information. This weight can be used as a correction amount for making the deviation between the correct label and the recognition result closer to ideal during learning. By setting such a weight, the recognition performance of the second parameter can be reflected to the recognition performance of the first parameter.

On the other hand, the third parameter generation unit 30 may use the first parameter and the second parameter to generate the third parameter so as to be adapted to the new environment. Hereinafter, information indicating a new environment will be referred to as new domain information. In this case, the third parameter generation unit 30 preferentially selects a parameter, for which domain information included in the learning data used to generate the parameter is closer to new domain information indicating a new environment, from the first parameter and the second parameter. Then, the third parameter generation unit 30 generates the third parameter such that the certainty factor of the recognition result becomes higher as the domain information included in the first learning data coincides more with the new domain information.

The pattern recognition unit 50 performs pattern recognition of the input data using the recognizer specified by the generated third parameter.

The first parameter generation unit 10, the second parameter generation unit 20, the third parameter generation unit 30, and the pattern recognition unit 50 are realized by a CPU (Central Processing Unit) of a computer that operates according to a program (parameter generation program). For example, the program may be stored in the storage unit 40 of the pattern recognition device 100, and the CPU may read the program and operate as the first parameter generation unit 10, the second parameter generation unit 20, the third parameter generation unit 30, and the pattern recognition unit 50 according to the program.

Moreover, each of the first parameter generation unit 10, the second parameter generation unit 20, the third parameter generation unit 30, and the pattern recognition unit 50 may be realized by dedicated hardware.

Figure 4:
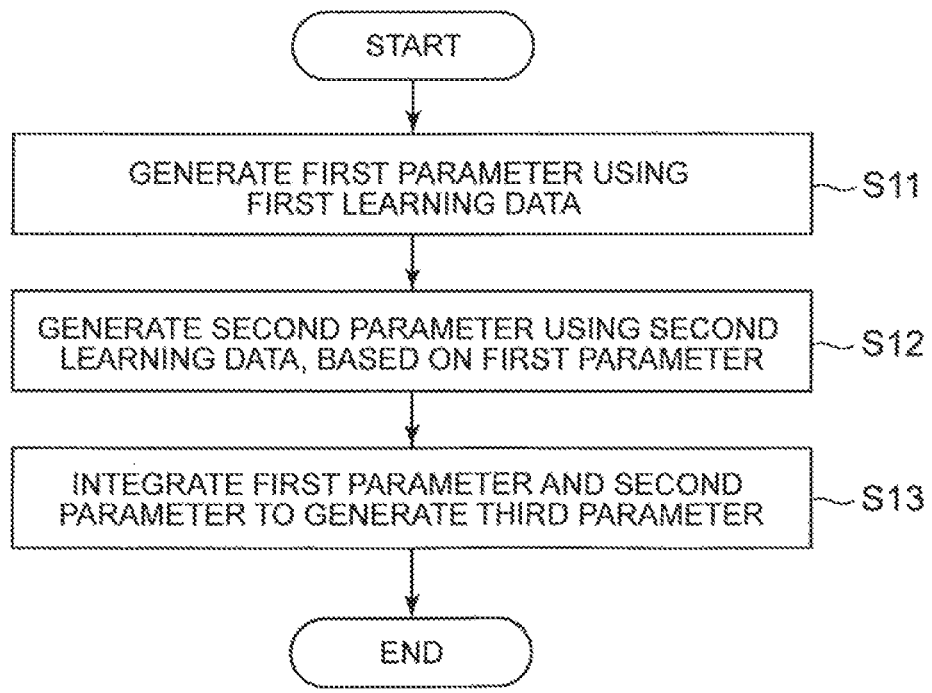
FIG. 4 It depicts a flowchart illustrating an operation example of a pattern recognition system of the first exemplary embodiment.

Next, the operation of the pattern recognition system of this exemplary embodiment will be described. FIG. 4 is a flowchart illustrating an operation example of the pattern recognition system 1 of this exemplary embodiment. The first parameter generation unit 10 generates a first parameter using first learning data (step S11). The second parameter generation unit 20 generates a second parameter using second learning data based on the first parameter (step S12). Then, the third parameter generation unit 30 integrates the first parameter and the second parameter to generate a third parameter (step S13). At this time, the third parameter generation unit 30 generates the third parameter so as to prioritize the recognition result obtained using the second parameter in the learning using the first learning data including domain information that coincides with target domain information.

As described above, the first parameter generation unit 10 generates the first parameter using the first learning data, and the second parameter generation unit 20 generates the second parameter using the second learning data based on the first parameter in this exemplary embodiment. Then, the third parameter generation unit 30 integrates the first parameter and the second parameter to generate the third parameter. At this time, the third parameter generation unit 30 generates the third parameter so as to prioritize the recognition result obtained using the second parameter in the learning using the first learning data including domain information that coincides with target domain information.

It is therefore possible to improve the generalization performance of the recognizer that performs pattern recognition without increasing the learning patterns. As a result, the basic performance of the basic recognition engine can be improved, and the tuning work of the recognition engine (secondary AI) of the system installed on the spot can be reduced.

Next, a modification of a pattern recognition system of this exemplary embodiment will be described. In the above exemplary embodiment, a case is explained where the second parameter generation unit 20 generates one type of second parameter and the third parameter generation unit 30 integrates the second parameter with the first parameter to generate the third parameter. It is to be noted that the second parameter integrated with the first parameter is not limited to one type.

Figure 5:
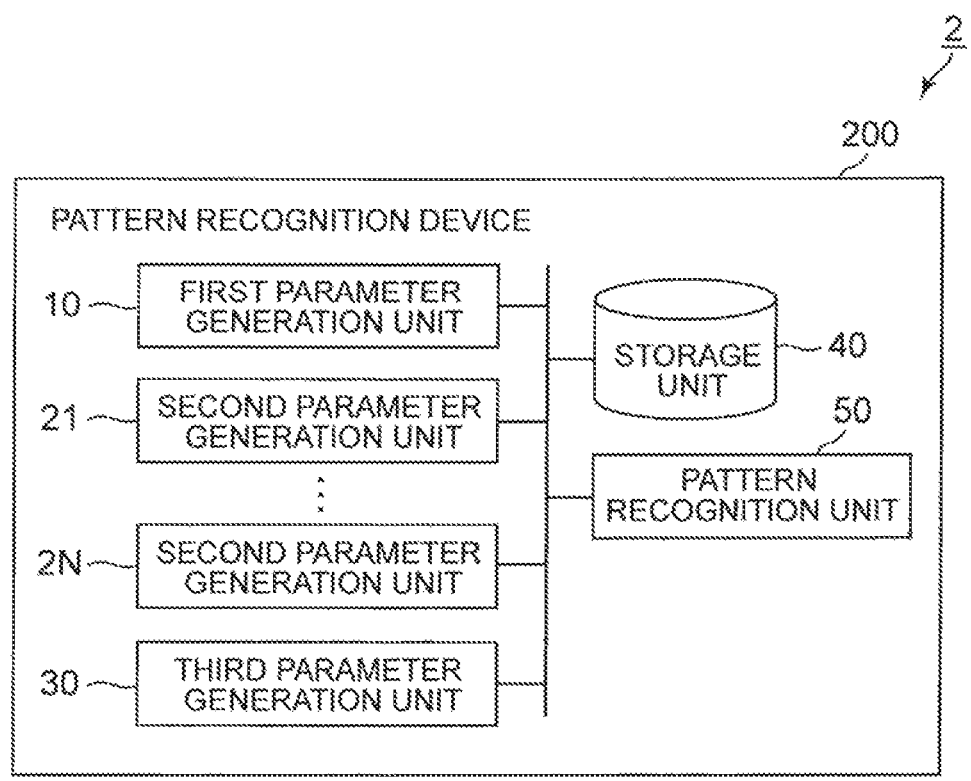
FIG. 5 It depicts a block diagram illustrating a modification of a pattern recognition system of the first exemplary embodiment.

FIG. 5 is a block diagram illustrating a modification of a pattern recognition system of the first exemplary embodiment. A pattern recognition device 200 of a pattern recognition system 2 illustrated in FIG. 5 includes a first parameter generation unit 10, a plurality of second parameter generation units 21 to 2N, a third parameter generation unit 30, a storage unit 40, and a pattern recognition unit 50. That is, this modification is different from the above exemplary embodiment in that the pattern recognition device 200 includes a plurality of second parameter generation units 21 to 2N.

The contents of each of the second parameter generation units 21 to 2N are the same as the contents of the second parameter generation unit 20 of the first exemplary embodiment. The third parameter generation unit 30 integrates the first parameter and a plurality of types of second parameters to generate a third parameter. Specifically, the third parameter generation unit 30 generates the third parameter so as to prioritize the recognition result obtained using the corresponding second parameter in the learning using the first learning data including domain information that coincides with target domain information of each second parameter. It is to be noted that the method by which the third parameter generation unit 30 generates the third parameter is the same as that of the first exemplary embodiment.

In this way, the third parameter generation unit 30 integrates the first parameter and the plurality of types of second parameters to generate the third parameter, thereby generating a recognition engine that reflects the recognition performance of the plurality of second parameters.

Second Exemplary Embodiment

Next, the second exemplary embodiment of a pattern recognition system of the present invention will be described. It is expected that the third parameter generated in the first exemplary embodiment has improved generalization performance. On the other hand, since the second parameter is a parameter tuned based on a predetermined collection environment, it is assumed that the second parameter has recognition performance more adapted to the data collection environment than the third parameter. Therefore, a method of determining whether the parameter is updated or not according to the recognition performance will be described in this exemplary embodiment.

Figure 6:
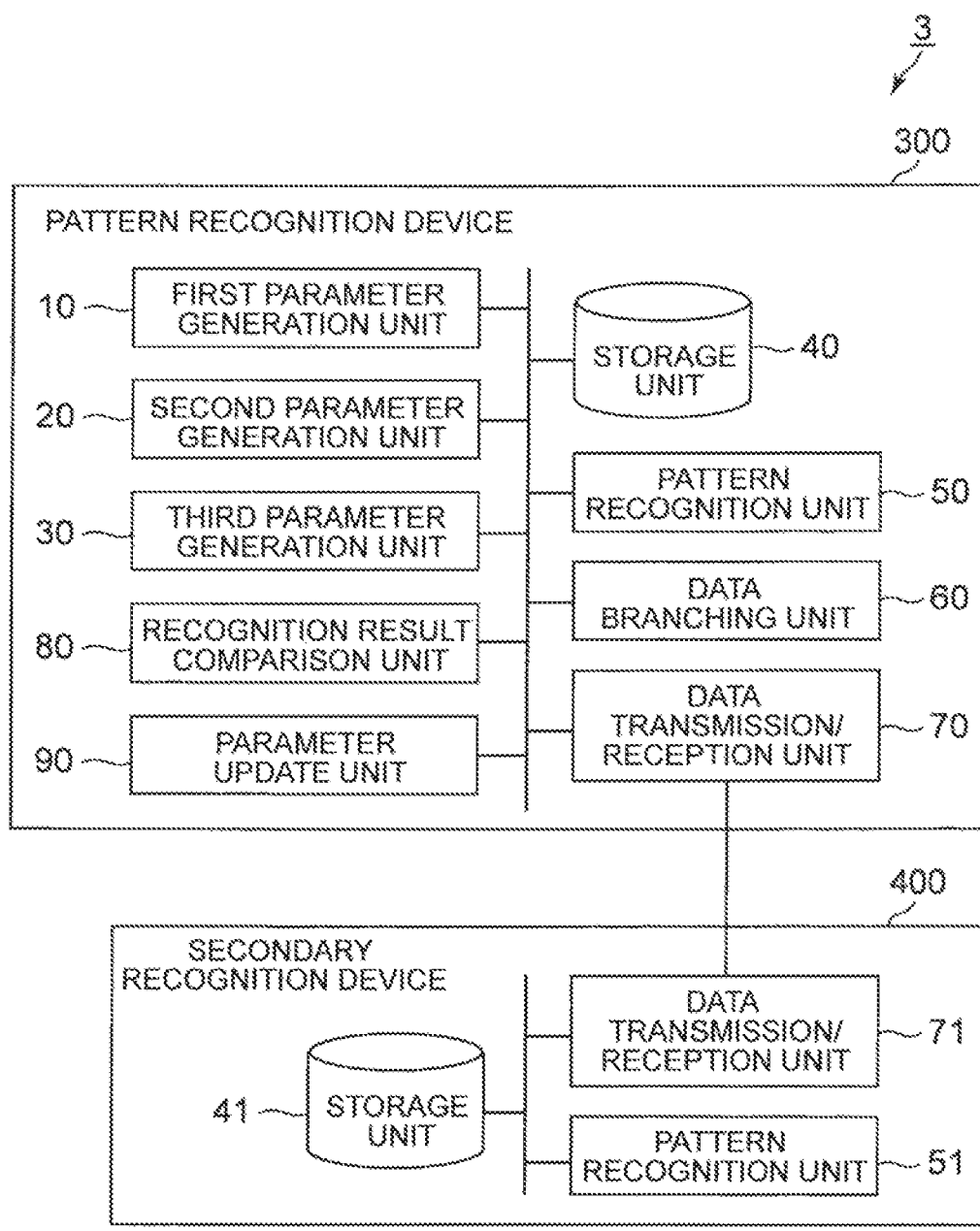
FIG. 6 It depicts a block diagram illustrating a configuration example of a second exemplary embodiment of a pattern recognition system of the present invention.

FIG. 6 is a block diagram illustrating a configuration example of the second exemplary embodiment of a pattern recognition system of the present invention. A pattern recognition system 3 of this exemplary embodiment includes a pattern recognition device 300 and a secondary recognition device 400.

The secondary recognition device 400 is a device that performs pattern recognition of input data. The secondary recognition device 400 includes a storage unit 41, a pattern recognition unit 51, and a data transmission/reception unit 71.

The data transmission/reception unit 71 transmits or receives data to or from the pattern recognition device 300.

The storage unit 41 stores a parameter to be used for pattern recognition by the pattern recognition unit 51. For example, when a data collection environment of the secondary recognition device 400 corresponds to a collection environment of the second learning data, the storage unit 41 may store the second parameter. In this case, the pattern recognition unit 51, which will be described later, performs pattern recognition based on a second parameter stored in the storage unit 41.

The pattern recognition unit 51 performs pattern recognition of input data using a recognizer specified by a parameter stored in the storage unit 41. As described above, when the storage unit 41 stores a second parameter, the pattern recognition unit 51 performs pattern recognition of input data using a recognizer specified by the second parameter. However, the parameter used by the pattern recognition unit 51 for pattern recognition is not limited to the second parameter. The content of the parameter is sequentially updated into a parameter generated by a parameter update unit 90 of the pattern recognition device 300, which will be described later.

The pattern recognition device 300 includes a first parameter generation unit 10, a second parameter generation unit 20, a third parameter generation unit 30, a storage unit 40, a pattern recognition unit 50, a data branching unit 60, a data transmission/reception unit 70, a recognition result comparison unit 80, and the parameter update unit 90. It is to be noted that the pattern recognition device 300 may include a plurality of second parameter generation units 21 to 2N.

That is, in comparison with the pattern recognition device 100 of the first exemplary embodiment, the pattern recognition device 300 of the second exemplary embodiment further includes the data branching unit 60, the data transmission/reception unit 70, the recognition result comparison unit 80, and the parameter update unit 90. It is to be noted that the configurations of the first parameter generation unit 10, the second parameter generation unit 20, the third parameter generation unit 30, the storage unit 40, and the pattern recognition unit 50 are the same as those of the first exemplary embodiment.

The data transmission/reception unit 70 transmits or receives data to or from the secondary recognition device 400.

The data branching unit 60 inputs the input data to be recognized respectively to the pattern recognition unit 50 of the pattern recognition device 300, and the pattern recognition unit 51 of the secondary recognition device 400. Then, the data branching unit 60 inputs the recognition result obtained by the pattern recognition unit 50 and the pattern recognition unit 51 to the recognition result comparison unit 80. Video data is inputted to the data branching unit 60, for example.

The recognition result comparison unit 80 compares the performance of a parameter used by the secondary recognition device 400 for pattern recognition with the performance of the generated third parameter. More specifically, the recognition result comparison unit 80 compares the recognition result obtained using the second parameter with the recognition result obtained using the third parameter to determine the recognition accuracy. The recognition result comparison unit 80 may determine, for example, a parameter having a higher degree of coincidence between a recognition result obtained using each parameter and a result indicated by the correct label included in the first learning data, as a parameter having higher recognition accuracy.

The recognition result comparison unit 80 may determine the recognition accuracy by, for example, totaling the difference between the recognition result of the data included in the first learning data and the correct label for a plurality of learning data. Here, the above-described recognition accuracy determination method is an example, and the recognition result comparison unit 80 may determine the recognition accuracy by another widely known method.

The parameter update unit 90 updates a parameter to be used by the secondary recognition device 400 for pattern recognition. Specifically, when the recognition result comparison unit 80 determines that the third parameter has higher recognition accuracy than the second parameter, the parameter update unit 90 updates the second parameter to be used by the secondary recognition device for recognition processing into the third parameter.

In this way, a device other than the secondary recognition device 400 determines whether to update a parameter or not, so that it is possible to update a parameter of the secondary recognition device 400 without interrupting the task of the secondary recognition device 400.

It is to be noted that the parameter update unit 90 may generate a smaller parameter corresponding to a student model from the third parameter corresponding to the teacher model, based on knowledge distillation in consideration of computer resource constraints for realizing the secondary recognition device. It should be noted that a method of generating a student model from a teacher model is widely known, and a detailed description thereof will be omitted here. The parameter update unit 90 may perform knowledge distillation in consideration of the content of a parameter and computer resource constraints.

The first parameter generation unit 10, the second parameter generation unit 20, the third parameter generation unit 30, the pattern recognition unit 50, the data branching unit 60, the data transmission/reception unit 70, the recognition result comparison unit 80, and the parameter update unit 90 are realized by a CPU of a computer that operates according to a program (parameter generation program). The pattern recognition unit 51 and the data transmission/reception unit 71 in the secondary recognition device 400 are also realized by a CPU of a computer that operates according to a program.

Figure 7:
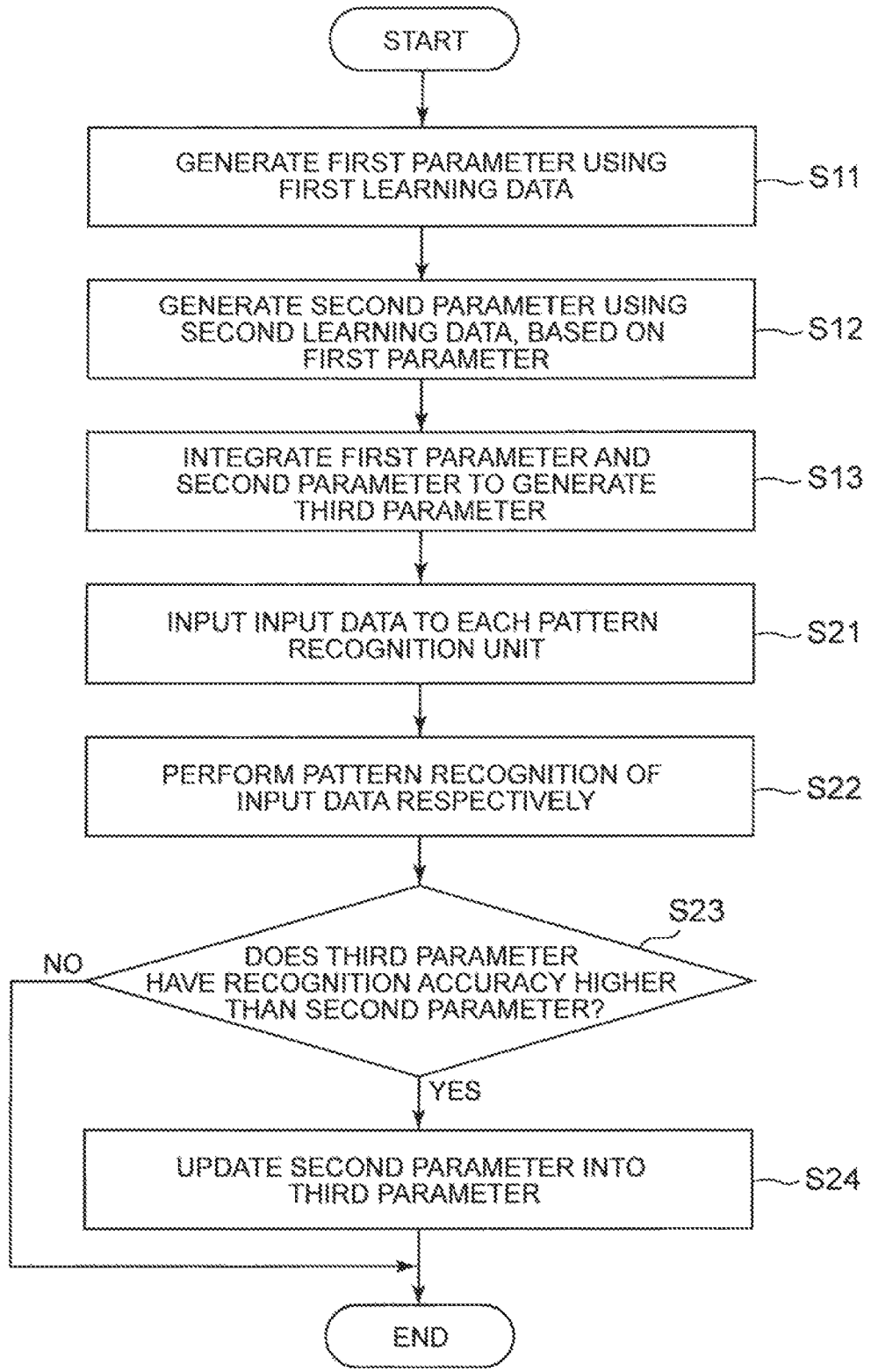
FIG. 7 It depicts a flowchart illustrating an operation example of a pattern recognition system of the second exemplary embodiment.

Next, the operation of the pattern recognition system of this exemplary embodiment will be described. FIG. 7 is a flowchart illustrating an operation example of the pattern recognition system 3 of this exemplary embodiment. It is to be noted that the processes until the third parameter generation unit 30 integrates the first parameter and the second parameter to generate the third parameter are the same as the processes from step S11 to step S13 in FIG. 4.

The data branching unit 60 inputs the input data respectively to the pattern recognition unit 50 of the pattern recognition device 300, and the pattern recognition unit 51 of the secondary recognition device 400 (step S21). The pattern recognition unit 50 of the pattern recognition device 300 and the pattern recognition unit 51 of the secondary recognition device 400 each perform pattern recognition of the input data (step S22). That is, the pattern recognition unit 50 of the pattern recognition device 300 performs pattern recognition based on the third parameter, and the pattern recognition unit 51 of the secondary recognition device 400 performs pattern recognition based on the second parameter.

The recognition result comparison unit 80 compares the recognition result obtained by the pattern recognition unit 51 (i.e., recognition result obtained using second parameter) with the recognition result obtained by the pattern recognition unit 50 (i.e., recognition result obtained using third parameter) and determines whether the third parameter has higher recognition accuracy than the second parameter or not (step S23).

When the third parameter has higher recognition accuracy than the second parameter (Yes in step S23), the parameter update unit 90 updates the second parameter to be used by the secondary recognition device 400 for recognition processing into the third parameter (step S24). On the other hand, when the third parameter does not have higher recognition accuracy than the second parameter (No in step S23), the parameter updating process is not performed, and the processing is terminated.

As described above, the recognition result comparison unit 80 compares the recognition result obtained using the second parameter with the recognition result obtained using the third parameter in this exemplary embodiment in addition to the configuration of the first exemplary embodiment. Therefore, it becomes possible to select a parameter having higher recognition accuracy.

Next, a modification of this exemplary embodiment will be described. In the second exemplary embodiment, a method in which the recognition result comparison unit 80 determines the accuracy of the recognition result using the learning data has been described. It is to be noted that it is also possible to use a determination result by the user as this determination result. In this modification, a method will be described in which the recognition result comparison unit 80 allows the user to input the determination result.

Figure 8:
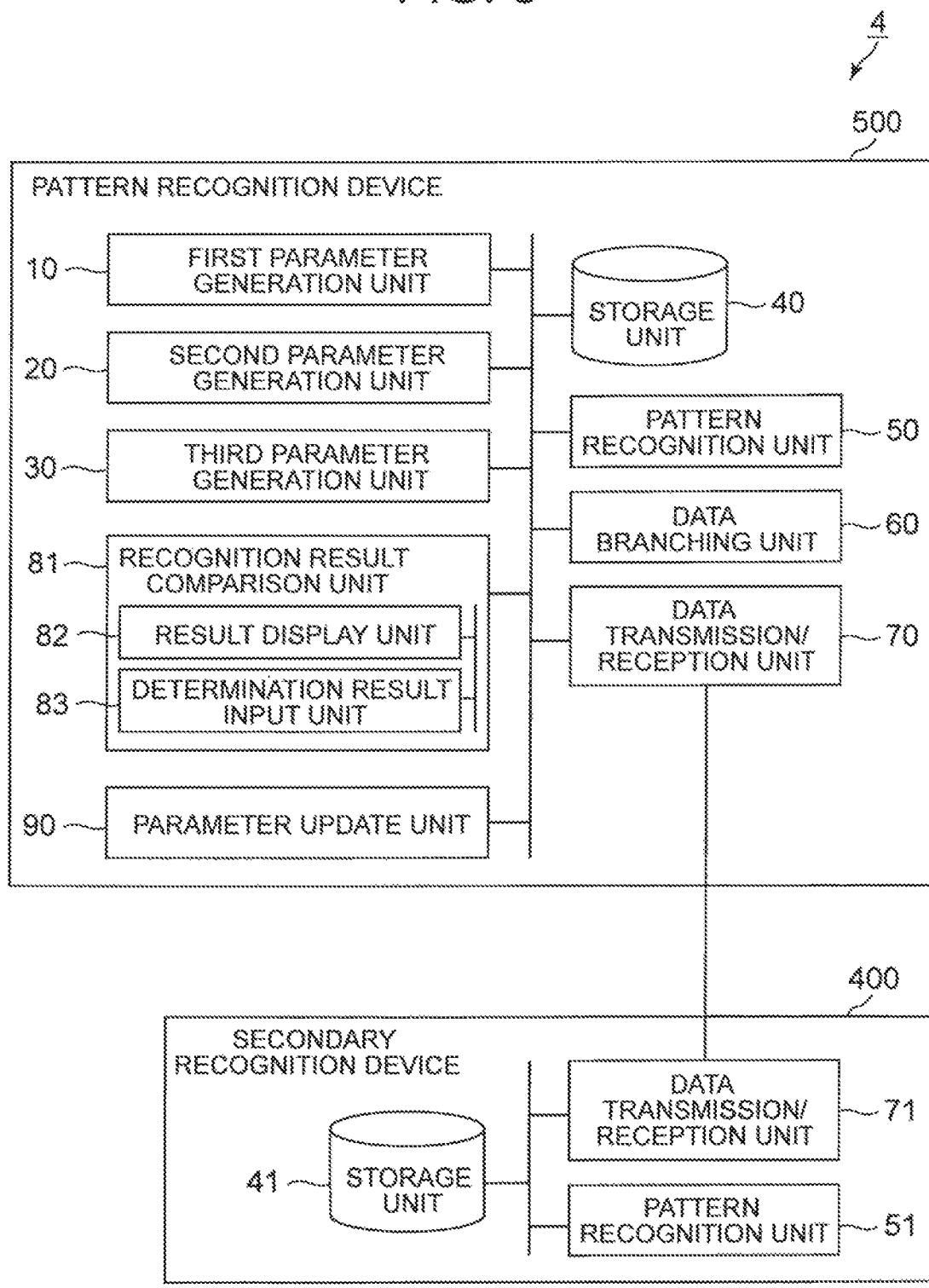
FIG. 8 It depicts a block diagram illustrating a modification of a pattern recognition system of the second exemplary embodiment.

FIG. 8 is a block diagram illustrating a modification of the pattern recognition system of the second exemplary embodiment. A pattern recognition system 4 illustrated in FIG. 8 includes a pattern recognition device 500 and a secondary recognition device 400. The configuration of the secondary recognition device 400 is the same as the configuration of the secondary recognition device 400 of the second exemplary embodiment.

The pattern recognition device 500 includes a first parameter generation unit 10, a second parameter generation unit 20, a third parameter generation unit 30, a storage unit 40, a pattern recognition unit 50, a data branching unit 60, a data transmission/reception unit 70, a recognition result comparison unit 81, and a parameter update unit 90. That is, the configuration of the pattern recognition device 500 is the same as the configuration of the pattern recognition device 300 of the second exemplary embodiment, except that the contents of the recognition result comparison unit 80 are replaced with the recognition result comparison unit 81.

The recognition result comparison unit 81 includes a result display unit 82 and a determination result input unit 83.

The result display unit 82 outputs a recognition result obtained using the second parameter and a recognition result obtained using the third parameter. The result display unit 82 may output a recognition result for the input data, or a certainty factor for the recognition result, for example.

The determination result input unit 83 inputs a determination result by the user based on the recognition result outputted by the result display unit 82. The determination result input unit 83 may accept, for example, which of the recognition result obtained using the second parameter and the recognition result obtained using the third parameter has higher recognition accuracy from the user. Processes after receiving the input of determination result (i.e., processes the parameter update unit 90) are the same as those of the second exemplary embodiment.

As described above, the recognition result comparison unit 81 accepts the determination result from the user regarding the recognition result in this modification. Therefore, the recognition result for arbitrary data other than learning data can be reflected in the parameter selection.

Third Exemplary Embodiment

Next, the third exemplary embodiment of a pattern recognition system of the present invention will be described. In the first exemplary embodiment and the second exemplary embodiment, a case has been described in which the learning data is prestored in the storage unit 40. It is to be noted that the learning data may be generated in association with the operation task of the operator. By generating the learning data from the viewpoint of the operator, it becomes possible to generate a more appropriate parameter.

Figure 9:
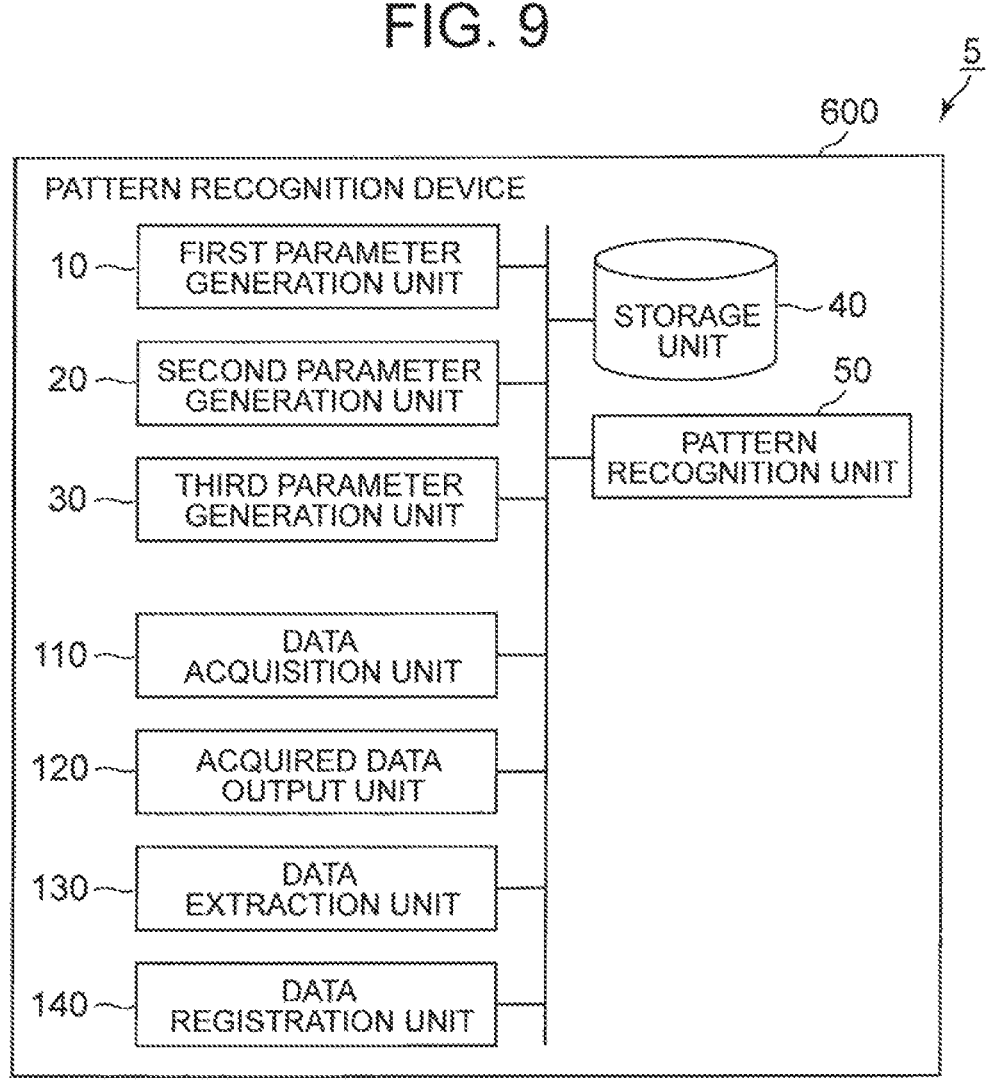
FIG. 9 It depicts a block diagram illustrating a configuration example of a third exemplary embodiment of a pattern recognition system of the present invention.

FIG. 9 is a block diagram illustrating a configuration example of the third exemplary embodiment of a pattern recognition system of the present invention. A pattern recognition system 5 of this exemplary embodiment includes a pattern recognition device 600. It is to be noted that the pattern recognition system 5 of this exemplary embodiment may include the secondary recognition device 400 of the second exemplary embodiment.

The pattern recognition device 600 includes a first parameter generation unit 10, a second parameter generation unit 20, a third parameter generation unit 30, a storage unit 40, a pattern recognition unit 50, a data acquisition unit 110, an acquired data output unit 120, a data extraction unit 130, and a data registration unit 140. It is to be noted that the pattern recognition device 600 may include the data branching unit 60, the data transmission/reception unit 70, the recognition result comparison unit 80, and the parameter update unit 90 of the second exemplary embodiment.

The data acquisition unit 110 acquires data to be recognized. For example, when image data or video data is data to be recognized, the data acquisition unit 110 is realized by an imaging device such as a camera. Moreover, when voice data is data to be recognized, for example, the data acquisition unit 110 is realized by a voice recorder or the like. Moreover, when text data is data to be recognized, for example, the data acquisition unit 110 is realized by OCR (Optical Character Recognition), a voice recognition device, or the like. Moreover, a collection environment in which the data acquisition unit 110 collects data is preset as domain information by the user or the like.

The acquired data output unit 120 outputs the data acquired by the data acquisition unit 110. The acquired data output unit 120 may display, for example, image data or video data on a display device (not shown) such as a display.

The data extraction unit 130 extracts data outputted by the acquired data output unit 120 in response to an instruction from the user. It is assumed that the contents (i.e., correct label) of data to be extracted are preset.

For example, it is assumed that an operator refers to a monitor and performs an operation task of monitoring a suspicious person. At this time, the data acquisition unit 110 photographs a predetermined range as needed, and the acquired data output unit 120 outputs video. When the operator finds a suspicious person in the video, the data extraction unit 130 extracts the image data in response to, for example, a detection operation by the operator (e.g., operation of clicking the suspicious person on the screen).

Moreover, the method of extracting image data is also arbitrary, and the data acquisition unit 110 may extract the entire displayed image data, or may extract image data of a clicked peripheral region as a suspicious person region.

The data registration unit 140 registers the data extracted by the data extraction unit 130 in the storage unit 40. Specifically, the extraction target of the operator is preset as a correct label, and domain information indicating the data collection environment is also preset. Therefore, the data registration unit 140 generates a combination of the extracted data, the correct label, and the domain information, and registers the combination in the storage unit 40 as learning data. It is to be noted that the data registration unit 140 may register the generated learning data as first learning data or as second learning data.

As described above, the data extraction unit 130 extracts data outputted in response to an instruction from the user, and the data registration unit 140 generates a combination of the extracted data, a correct label, and domain information and registers the combination in the storage unit 40 as learning data in this exemplary embodiment. Therefore, it becomes possible to generate more accurate learning data from the viewpoint of the operator.

Figure 10:
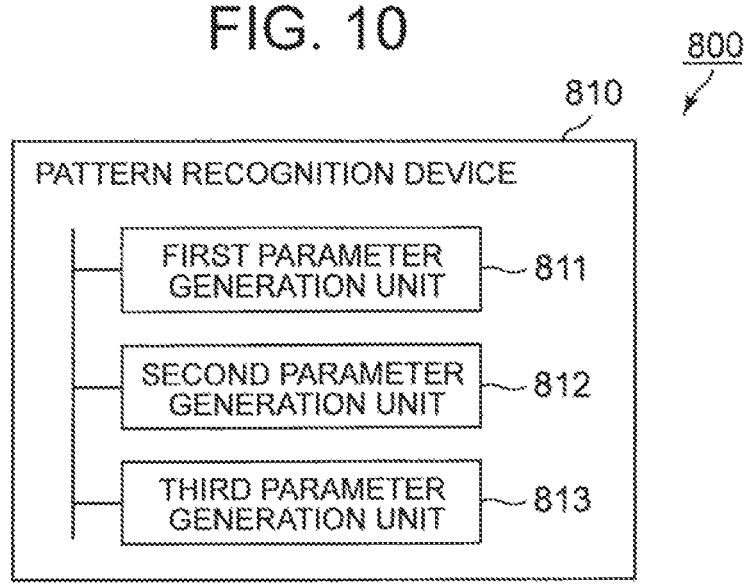
FIG. 10 It depicts a block diagram illustrating an outline of a pattern recognition system according to the present invention.

Next, an outline of the present invention will be described. FIG. 10 is a block diagram illustrating an outline of a pattern recognition system according to the present invention. A pattern recognition system 800 (e.g., pattern recognition system 1) according to the present invention includes a pattern recognition device 810 (e.g., pattern recognition device 100) that recognizes a pattern of input data.

The pattern recognition device 810 includes: a first parameter generation unit 811 (e.g., first parameter generation unit 10) configured to generate a first parameter, which is a parameter of a first recognizer, using first learning data including a combination of data to be recognized, a correct label of the data, and domain information indicating a collection environment of the data; a second parameter generation unit 812 (e.g., second parameter generation unit 20) configured to generate a second parameter, which is a parameter of a second recognizer, based on the first parameter using second learning data including a combination of data to be recognized, which is collected in a predetermined collection environment, a correct label of the data, and target domain information indicating the predetermined collection environment; and a third parameter generation unit 813 (e.g., third parameter generation unit 30) configured to integrate the first parameter and the second parameter to generate a third parameter to be used for pattern recognition of input data in learning using the first learning data.

The third parameter generation unit 813 generates the third parameter so as to prioritize the recognition result obtained using the second parameter in the learning using the first learning data including domain information that coincides with target domain information.

With such a configuration, it is possible to improve the generalization performance of the recognizer that performs pattern recognition without increasing the learning patterns.

The second parameter generation unit 812 may generate a second parameter using second learning data including a combination of data collected separately from the data included in the first learning data, a correct label of the data, and target domain information indicating a collection environment of the data. With such a configuration, it becomes possible to generate a parameter that further reflects the situation of each collection environment.

On the other hand, the second parameter generation unit 812 may generate a second parameter using learning data, for which a collection environment indicated by domain information included in first learning data coincides with a predetermined collection environment, among the first learning data. With such a configuration, it becomes possible to improve the generalization performance of the recognizer even when learning data cannot be collected in the collection environment indicated by the second domain information.

Moreover, the third parameter generation unit 813 may integrate the first parameter and the second parameter so as to prioritize a recognition result of a parameter more as the degree of coincidence of the domain information included in the learning data used for learning the parameter is higher, to generate the third parameter. With such a configuration, it becomes possible to take advantage of the properties of any parameters already generated.

Moreover, the third parameter generation unit 813 may preferentially select a parameter, for which domain information included in the learning data used to generate the parameter is closer to new domain information indicating a new environment, from the first parameter and the second parameter, and generate the third parameter so that the certainty factor of the recognition result becomes higher as the domain information included in the first learning data coincides more with the new domain information. With such a configuration, it becomes possible to improve the recognition accuracy in an environment different from the existing collection environment.

The pattern recognition device 810 may also include a recognition result comparison unit (e.g., recognition result comparison unit 80) that compares the recognition result obtained using the second parameter with the recognition result obtained using the third parameter. Then, the recognition result comparison unit may determine a parameter having a large degree of coincidence between the recognition result and the result indicated by the correct label included in the first learning data, as a parameter having higher recognition accuracy. With such a configuration, it becomes possible to select a parameter with higher recognition accuracy.

The pattern recognition system 800 may also include a secondary recognition device (e.g., secondary recognition device 400) that recognizes the pattern of input data based on the second parameter. In addition, the pattern recognition device 810 may include a parameter update unit (e.g., parameter update unit 90) that updates a parameter to be used by the secondary recognition device for recognition. In addition, when it is determined that the third parameter has higher recognition accuracy than the second parameter, the parameter update unit may update the second parameter to be used by the secondary recognition device for recognition processing into the third parameter.

Moreover, the parameter update unit may generate a smaller parameter from the third parameter based on knowledge distillation, and update the second parameter to be used by the secondary recognition device for recognition processing with the generated parameter. With such a configuration, it becomes possible to cope with resource constraints of the secondary recognition device.

INDUSTRIAL APPLICABILITY

The present invention is preferably applied to a pattern recognition system that improves pattern recognition performance. For example, the present invention is preferably applied to, for example, a system equipped with an image recognition engine for a large-scale monitoring system, or a defect inspection system for FA (Factory Automation).

Specifically, the present invention can be preferably applied to a system that uses a recognition engine for a large-scale monitoring system in which cameras are installed on many spots and a main recognition engine and a local system engine are separately operated.

REFERENCE SIGNS LIST

1 to 5 Pattern recognition system
10 First parameter generation unit
20, 21 to 2N Second parameter generation unit
30 Third parameter generation unit
40, 41 Storage unit
50, 51 Pattern recognition unit
60 Data branching unit
70, 71 Data transmission/reception unit
80, 81 Recognition result comparison unit
82 Result display unit
83 Determination result input unit
100, 200, 300, 500 Pattern recognition device
110 Data acquisition unit
120 Acquired data output unit
130 Data extraction unit
140 Data registration unit
400 Secondary recognition device

The invention claimed is:
1. A pattern recognition system comprising a pattern recognition device configured to recognize a pattern of input data,
wherein the pattern recognition device includes a first hardware processor configured to execute a software code to:
generate a first parameter a first recognizer, using first learning data including a first combination of first data to be recognized, a first correct label of the first data, and first domain information indicating a first collection environment of the first data;
generate a second parameter of a second recognizer, using second learning data including a second combination of second data to be recognized that is collected in a second collection environment, a second correct label of the second data, and second domain information indicating the second collection environment, based on the first parameter;
integrate the first parameter and the second parameter to generate a third parameter to be used for pattern recognition of the input data by learning using the first learning data; and
generate the third parameter so as to prioritize a recognition result obtained using the second parameter in learning using the first learning data including the first domain information that coincides with the second domain information.

2. The pattern recognition system according to claim 1, wherein the first hardware processor is configured to execute the software code to generate the second parameter using the second learning data including the second combination of the second data that is collected separately from the first data included in the first learning data, the second correct label of the second data, and the second domain information indicating the second collection environment.

3. The pattern recognition system according to claim 1, wherein the first hardware processor is configured to execute the software code to generate the second parameter using the second learning data, for which the first collection environment indicated by the first domain information included in the first learning data coincides with the second collection environment.

4. The pattern recognition system according to claim 1, wherein the first hardware processor is configured to execute the software code to integrate the first parameter and the second parameter to generate the third parameter so as to prioritize the recognition result obtained using second parameter using the first learning data more as a degree of coincidence of the first domain information with the second domain information is higher.

5. The pattern recognition system according to claim 1, wherein the first hardware processor is configured to execute the software code to preferentially select first or second parameter for which the first or second domain information included in the first or second learning data used to generate the first or second parameter is closer to new domain information indicating a new environment, and generate the third parameter so that a certainty factor of the recognition result becomes higher as the first domain information included in the first learning data coincides more with the new domain information.

6. The pattern recognition system according to claim 1, wherein the first hardware processor is configured to execute the software code to:
compare the recognition result obtained using the second parameter with another recognition result obtained using the third parameter; and
selecting the second or third parameter having a higher degree of coincidence between the or the another recognition result and a result indicated by the first correct label included in the first learning data, as that which has higher recognition accuracy.

7. The pattern recognition system according to claim 6, further comprising a secondary recognition device configured to recognize a pattern of second input data based on the second parameter,
wherein the pattern recognition device includes a second hardware processor configured to execute another software code to:
update a fourth parameter to be used by the secondary recognition device for recognition; and
change the second parameter to be used by the secondary recognition device for recognition processing to the third parameter when the third parameter is determined to have the higher recognition accuracy.

8. The pattern recognition system according to claim 7, wherein the second hardware processor is configured to execute the another software code to generate a smaller parameter than the third parameter based on knowledge distillation, and update the second parameter to be used by the secondary recognition device for recognition processing with the generated smaller parameter.

9. A parameter generation method comprising:
generating a first parameter a first recognizer, using first learning data including a first combination of first data to be recognized, a first correct label of the first data, and first domain information indicating a first collection environment of the first data;
generating a second parameter of a second recognizer, using second learning data including a second combination of second data to be recognized that is collected in a second collection environment, a second correct label of the second data, and second domain information indicating the second collection environment, based on the first parameter;
integrating the first parameter and the second parameter to generate a third parameter to be used for pattern recognition of input data by learning using the first learning data; and
generating the third parameter so as to prioritize a recognition result obtained using the second parameter in learning using the first learning data including the first domain information that coincides with the second domain information.

10. A non-transitory computer readable information recording medium storing a parameter generation program that when executed by a processor causes the processor to perform a method comprising:
generating a first parameter, a first recognizer, using first learning data including a first combination of first data to be recognized, a first correct label of the first data, and first domain information indicating a first collection environment of the first data;
generating a second parameter of a second recognizer, using second learning data including a second combination of second data to be recognized that is collected in a second collection environment, a second correct label of the second data, and second domain information indicating the second collection environment, based on the first parameter;
integrating the first parameter and the second parameter to generate a third parameter to be used for pattern recognition of input data by learning using the first learning data; and
generating the third parameter so as to prioritize a recognition result obtained using the second parameter in learning using the first learning data including the first domain information that coincides with the second domain information.

* * * * *